(12) United States Patent
Bagaini (10) Patent No.: US 9,158,019 B2
(45) Date of Patent: Oct. 13, 2015

(54) ENHANCING LOW FREQUENCY CONTENT IN MARINE SIMULTANEOUS VIBROSEIS ACQUISITION

(75) Inventor: Claudio Bagaini, Bekkestua (NO)

(73) Assignee: WESTERNGECO L.L.C., Houston, TX (US)

( * ) Notice: Subject to any disclaimer, the term of this patent is extended or adjusted under 35 U.S.C. 154(b) by 731 days.

(21) Appl. No.: 13/479,759

(22) Filed: May 24, 2012

(65) Prior Publication Data

US 2012/0314536 A1 Dec. 13, 2012

Related U.S. Application Data

(60) Provisional application No. 61/494,648, filed on Jun. 8, 2011.

(51) Int. Cl.
*G01V 1/38* (2006.01)
(52) U.S. Cl.
CPC ............ *G01V 1/3808* (2013.01); *G01V 1/3861* (2013.01)
(58) Field of Classification Search
CPC ............................ G01V 1/3803; G01V 1/3861
USPC .......................................................... 367/23
See application file for complete search history.

(56) References Cited

U.S. PATENT DOCUMENTS

| 4,064,479 A | 12/1977 | Ruehle |
| 4,914,636 A | 4/1990 | Garrotta |
| 6,942,059 B2 | 9/2005 | Smith |
| 7,257,049 B1 | 8/2007 | Laws et al. |
| 7,327,633 B2 | 2/2008 | Bagaini et al. |
| 7,376,046 B2 | 5/2008 | Jeffryes |
| 2010/0254215 A1 | 10/2010 | Cambois |
| 2011/0038225 A1* | 2/2011 | Tenghamn ...................... 367/21 |
| 2012/0188845 A1 | 7/2012 | Jeffryes |

FOREIGN PATENT DOCUMENTS

| GB | 2451630 | 12/2009 |
| WO | 2009085474 | 7/2009 |

OTHER PUBLICATIONS

International Search Report of PCT Application No. PCT/US2012/041219 dated Feb. 13, 2013: pp. 1-3.
Dragoset, "Marine vibrators and the Doppler effect," Geophysics, Nov. 1988, vol. 53(11): pp. 1388-1398.
Schultz et al., "Simple Theory for Correction of Marine Vibroseis Phase Dispersion," SEG Annual Meeting, 1989: pp. 660-662.

* cited by examiner

*Primary Examiner* — Mark Hellner (57) ABSTRACT

A technique is designed for conducting a seismic survey. The technique utilizes a plurality of vibrator arrays employed to conduct a seismic survey utilizing low frequency and high frequency vibrators in each vibrator array. The plurality of vibrator arrays continuously sweeps low frequency signals via low frequency vibrators. While sweeping low frequency signals, high-frequency vibrators emit high-frequency signals in an alternating pattern between vibrator arrays to enhance the seismic survey.

26 Claims, 8 Drawing Sheets

ENHANCING LOW FREQUENCY CONTENT IN MARINE SIMULTANEOUS VIBROSEIS ACQUISITION

CROSS-REFERENCE TO RELATED APPLICATION

This application claims benefit of U.S. Provisional Patent Application Ser. No. 61/494,648 filed Jun. 8, 2011, which is incorporated herein by reference in its entirety.

BACKGROUND

In a variety of environments, seismic surveys are performed to gain a better understanding of subterranean geological formations. In marine environments, for example, seismic surveys are conducted to improve the understanding of geological formations located beneath a body of water. In seismic survey applications, airguns are sometimes employed as seismic sources. The airguns are impulsive sources which use a controlled volume of high pressure air suddenly vented into the water. In other applications, marine seismic vibrators serve as continuous seismic sources that generate a peak output pressure substantially lower than airguns and thus the vibrators are expected to have a lower impact on marine mammals and other environmental considerations. To generate energy comparable to that generated by airguns, the marine vibrators generally emit their signals (sweep) for a long period of time; or several marine vibrators are simultaneously activated.

In towed marine applications using seismic vibrators, the maximum sweep length is equal to the shot point interval divided by the vessel speed. However, there are operational and economic limits to reduction in vessel speed. In marine acquisition using the same vessel to tow the streamer and the marine vibrator (the most common acquisition scenario), the operational limit is due to the need for a minimum vessel speed to keep the streamer afloat. The economic limit is due to the fact that a reduction in vessel speed increases the acquisition time and thus the acquisition cost.

SUMMARY

In general, the present disclosure provides a system and methodology for conducting a seismic survey. According to an embodiment, a technique utilizes a plurality of vibrator arrays employed to conduct a seismic survey utilizing low frequency and high frequency vibrators in each vibrator array. The plurality of vibrator arrays continuously sweeps low frequency signals via low frequency vibrators. While sweeping low frequency signals, high-frequency vibrators emit high-frequency signals in an alternating pattern between vibrator arrays to enhance the seismic survey.

BRIEF DESCRIPTION OF THE DRAWINGS

Certain embodiments of the disclosure will hereafter be described with reference to the accompanying drawings, wherein like reference numerals denote like elements, and.

DETAILED DESCRIPTION

In the following description, numerous details are set forth to provide an understanding of various embodiments herein. However, it will be understood by those of ordinary skill in the art that the present invention may be practiced without these details and that numerous variations or modifications from the described embodiments may be possible.

The present disclosure generally relates to marine vibroseis acquisition and to the enhancement of low-frequency content. Embodiments can increase the quality of seismic surveys performed using seismic vibrators. Additionally, the methodology can allow an increase in the energy emitted at low frequencies during marine surveys without meaningfully decreasing the vessel speed and thus without increasing the time needed to acquire data. According to embodiments described herein, more energy is emitted in the same area by continuously sweeping the low frequencies without increasing the number of source arrays.

To increase the energy emitted in marine vibroseis, particularly at the lower frequencies at which the marine vibrators tend to be deficient, several marine vibrators could be deployed to sweep simultaneously from different locations. For example, two arrays of vibrators could be deployed in a configuration that emulates the flip-flop configuration sometimes used in marine airgun acquisition. If, for example, vessel speed is 2.5 m/s and the in-line shot interval for each source that composes the flip-flop configuration is 25 m, the time interval between the start of the flip and the start of the flop sweeps is 10 seconds. This, however, is typically larger than the listening time in conventional 3-D acquisition and therefore no meaningful interference occurs between the flip and flop records except for the Earth's response to the harmonics generated by the flop source.

However, to generate more energy per unit area it is helpful for the vibrator arrays, e.g., the flip-flop vibrator arrays, to sweep consecutively. It should be noted that if two or more vibrator arrays sweep simultaneously, the signals must be separated and this can prove to be a challenging processing task. The unique system and methodology described below provide an approach for obtaining the benefit of consecutive, simultaneous sweeps while reducing the signal processing.

The present system and methodology is based on a variety of considerations which may be utilized to provide the enhanced seismic surveying with vibrator arrays. For example, the methodology is very useful in marine seismic surveys because the continuous motion inherent in towed marine acquisition naturally leads to a condition in which two or more seismic sources (i.e., an array of seismic sources) are simultaneously ready and have a pre-defined distance between them.

Marine vibrators are readily able to emit low frequencies of the seismic bandwidth, e.g., equal to or lower than 15 Hz, where the ambient and electronic noise typically is strong. Consequently, longer time is spent at these low frequencies and/or more sweeps are emitted in the same area to generate more acoustic energy so that when received by the acoustic receivers a sufficient signal-to-noise ratio exists. The system also may be designed so that the shot interval is frequency dependent and so two vibrators positioned in, for example, a flip-flop configuration can be considered a point source at the lower frequencies. Generally, there is no need to separate signals generated by sources whose separation distance is much smaller than the wavelengths that they emit because they effectively act as a point source.

Another consideration utilized to provide enhanced seismic surveying capability is the consideration that simultaneous and in-phase sweeping is an effective way to increase the signal-to-noise ratio for sources having separation distance much smaller than the horizontal wavelength of the signal. Phase differences produce detuning and therefore a reduction of the signal-to-noise ratio. Various present embodiments benefit from these characteristics by providing a vibrator array having both low and high frequency vibrators. It should be noted that high frequencies are more rapidly attenuated than low frequencies when traveling in the Earth's interior. Consequently, the required listening time for high frequencies is lower than for low frequencies. Furthermore, the signature (including the harmonics) generated by vibrator units operating in a marine environment is very repeatable.

Figure 1:
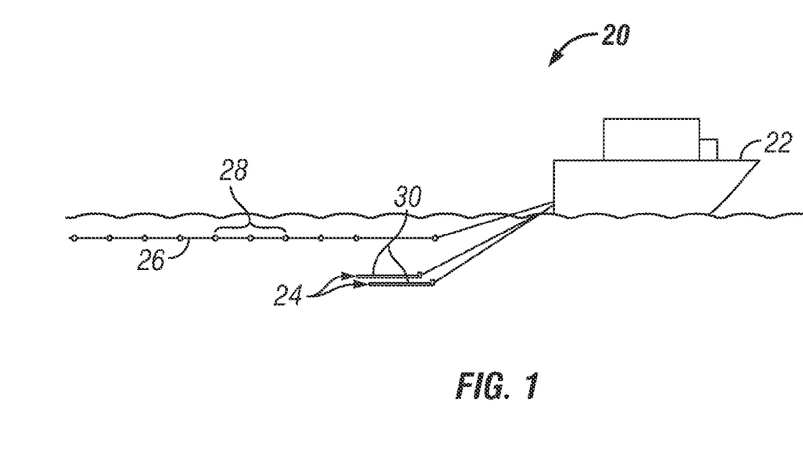
FIG. 1 is a schematic view of a tow vessel pulling a plurality of seismic vibrator arrays in a marine survey area, according to an embodiment of the present disclosure.

Although these considerations can be used to construct a variety of systems, the general methodology enhances low-frequency content in marine simultaneous vibroseis acquisition based upon the in-phase emission of low frequencies from two or more vibrator arrays. Although the methodology can be applied to land vibroseis acquisition, a general marine acquisition system is illustrated in FIG. 1. Marine acquisition is particularly suitable to the methodology because the continuous motion and the constant and predictable distance between sources are normal characteristics of towed marine acquisition, thus enhancing the efficiency of the method described herein.

Referring again to FIG. 1, an embodiment of a marine acquisition system 20 is illustrated. In this embodiment, a tow vessel 22 is illustrated as towing a plurality of marine source arrays 24, e.g., marine vibrator sub-arrays. The marine acquisition system 20 also may comprise one or more streamers 26 which are towed by the tow vessel 22. The one or more streamers 26 include a plurality of seismic receivers 28 designed to detect a reflected seismic signal initiated by seismic sources on the marine vibrator arrays 24. By way of example, the seismic sources on the marine vibrator arrays 24 may comprise high-frequency and low-frequency sources, such as suitable marine vibrators 30.

Figure 2:
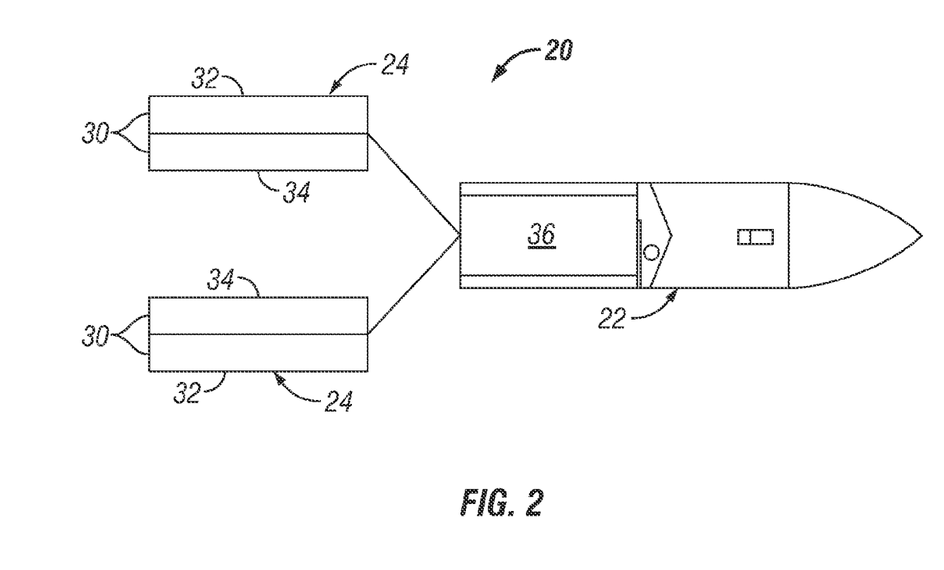
FIG. 2 is a schematic illustration of a tow vessel pulling seismic source arrays having high-frequency and low-frequency vibrators, according to an embodiment of the present disclosure.

As further illustrated in FIG. 2, the marine vibrators 30 on each marine vibrator array 24 comprise high-frequency sources 32, e.g., high-frequency vibrators, and low-frequency sources 34, e.g., low-frequency vibrators. The high-frequency vibrators 32 and the low frequency vibrators 34 may be controlled by electronics 36. In many applications, the electronics 36 are contained in a processor-based system located on the tow vessel 22.

The configuration of the overall marine acquisition system 20 may vary between seismic survey applications. For example, the plurality of marine vibrator arrays 24 may comprise two arrays 24, as illustrated in FIG. 2, or a greater number of arrays 24. Additionally, the seismic receivers 28 may be located in streamers 26 or at fixed positions, e.g., within a wellbore or along a seabed. Additionally, different vessels may be employed to tow the streamers 26 and the marine vibrator arrays 24. In some applications, two or more tow vessels 22 may be used to tow complementary groups of marine vibrator arrays 24 and/or streamers 26.

In conducting a seismic survey, the time-frequency representation of the sweeps is a factor, however the determination of sweep amplitudes in a manner compatible with the mechanical and hydraulic constraints of the marine vibrators 30 is available through various methods. For example, a method disclosed in U.S. Pat. No. 7,327,633B2 provides one approach that can be used for single seismic sources, while a suitable method for multiple seismic sources is disclosed in UK Patent GB 2451630. The method disclosed in the GB 2451630 patent also teaches a way to design composite sweeps with several vibrator units having an amplitude spectrum that does not suffer from a notch at overlapping frequencies. Additionally, the present methodology may utilize various approaches to enhancing the emitted energy that can be obtained from marine vibrators located at a depth which is variable and dependent on the emitted instantaneous frequency. One such method is described in U.S. Pat. No. 7,257, 049B1. Additionally, Doppler effects due to the motion of the seismic sources can be compensated or otherwise addressed. For example, methods have been described which enable accounting for the magnitude of the Doppler effect being greater for sweeps with a low sweep rate. See for example, Dragoset, W. H., 1988, *Marine Vibrators and the Doppler Effect, Geophysics*, 1388-1398; and Schultz et al., 1989, *Simple Theory for Correction of Marine Vibrator Phase Dispersion*, SEG annual meeting, 660-663.

The present system and methodology may have several embodiments and be utilized in various environments and applications. According to one embodiment, application parameters comprise a vessel moving at a speed of 2 to 3 meters per second, e.g., 2.5 m/s, towing two vibrator arrays in a flip-flop configuration, similar to flip-flop configurations used with airgun arrays. In this specific example, certain vibrators emit low-frequency signals which are output limited to 15 Hz or less with the minimum frequency of interest being 5 Hz. Each vibrator array 24 is composed of two types of seismic sources, namely low-frequency vibrators 34 and high-frequency vibrators 32 which are controlled by electronics 36. In some applications, the low-frequency vibrators 34 and the high-frequency vibrators 32 are controlled by two separate control electronics.

Figure 3:
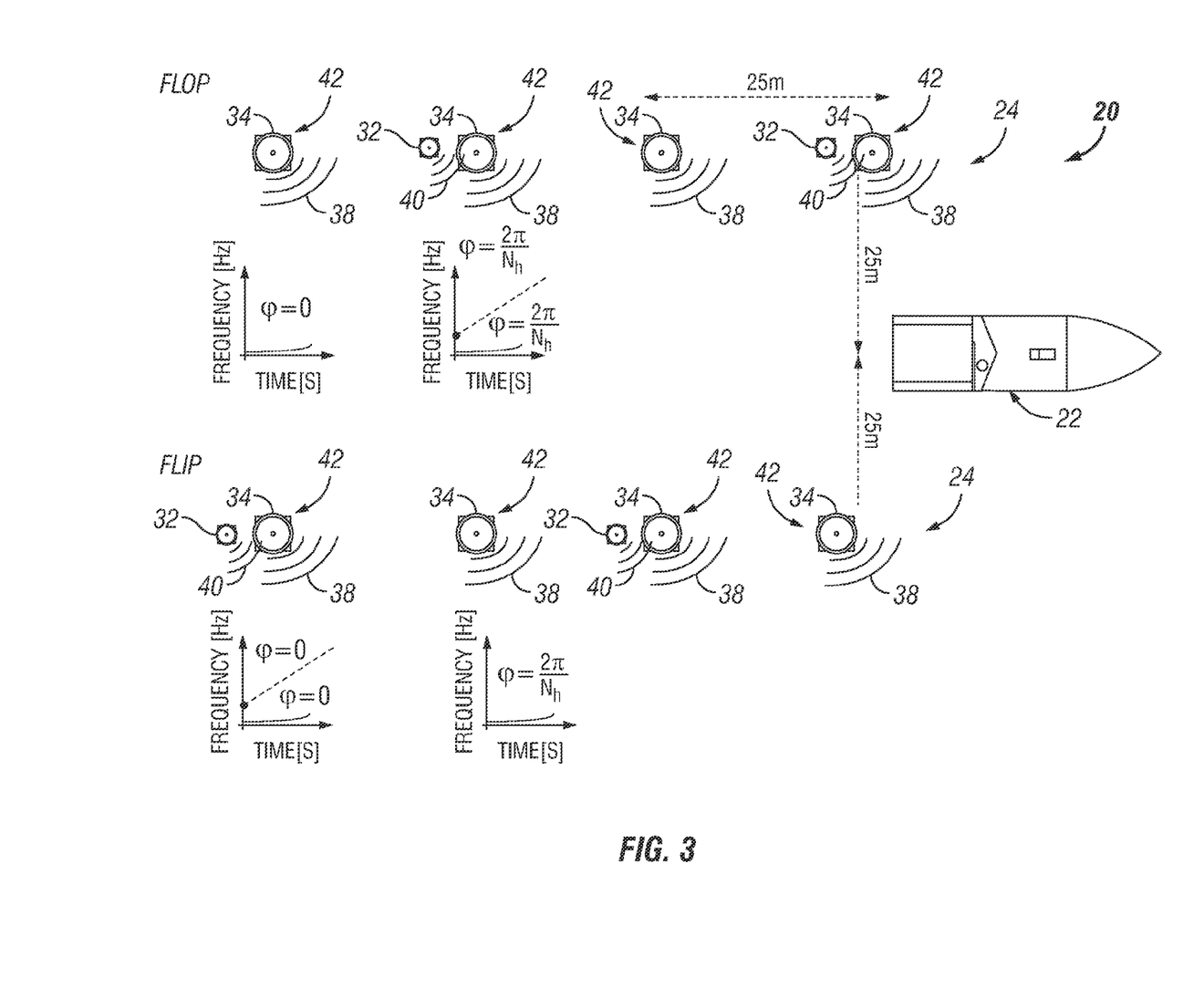
FIG. 3 is a schematic illustration showing the sweeping of low-frequency signals and the alternating output of high-frequency signals from the plurality of seismic vibrator arrays, according to an embodiment of the present disclosure.

With reference to FIG. 3, the low-frequency vibrators 34 of the two marine vibrator arrays 24 emit low-frequency signals 38, e.g., 5-15 Hz signals, simultaneously and in phase using a sweep of a desired duration. By way of example, the length of the sweep may be 8-12 seconds, e.g., 10 seconds, or another suitable length. The high-frequency vibrators 32 of the two marine vibrator arrays 24 emit high-frequency signals 40, e.g., above 15 Hz, with a sweep having a similar length, e.g., 10 seconds. The high-frequency marine vibrators 32 emit the high-frequency signals according to an alternating pattern, e.g., a flip-flop pattern or other suitable pattern, which alternates between vibrator arrays 24 of the pair of marine vibrator arrays.

For example, the high-frequency vibrators 32 of one vibrator array 24, e.g., the flip array, emit high frequencies with a sweep of the desired duration while the high-frequency units of the other vibrator array 24, e.g., the flop array, are silent. At t=10 seconds, the low-frequency vibrators 34 of both vibrator arrays 24 emit the same low-frequency sweep that was emitted in the previous sweep duration, as illustrated in FIG. 3. However, the roles of the high-frequency vibrators 32 of the "flip" and the "flop" arrays 24 are now interchanged and the high-frequency vibrators 32 of the second vibrator array 24, e.g., the flop array, emit the high-frequency sweep while the high-frequency vibrators of the flip array are silent. Consequently, the high-frequency sweeps occur in an alternating pattern between the vibrator arrays 24, as further illustrated in FIG. 3. If the tow vessel 22 is moving at approximately 2.5 m/s, the tow vessel 22 travels approximately 25 m during the 10 second sweep duration. However, other vessel speeds and frequency sweep durations may be used in other applications, and the specific values are provided only for the purpose of explanation.

To deterministically attenuate the harmonic noise (particularly that generated by the low-frequency sweeps) during velocity analysis and stack, the initial phases may change from shot to shot while preserving the condition that the low-frequency sweeps are always emitted in phase. The sequential shots 42 are illustrated schematically in FIG. 3 and may have shot intervals of 20 to 30 m, e.g., 25 m, or another suitable length. In this example, the initial phase variation from shot to shot is $2\pi/N_h$, where $N_h$ is the nominal common midpoint (CMP) fold.

Figure 8:
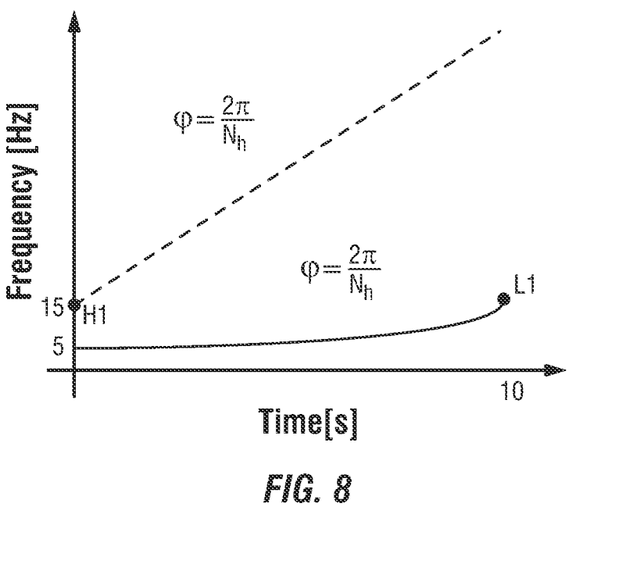
FIG. 8 is a graphical illustration showing a time-frequency representation of the emitted signal when the units in the vibrator array emit simultaneously the high and low frequencies, according to an embodiment of the present disclosure.

FIG. 3 provides a schematic representation of one example of marine vibroseis acquisition according to the present methodology. For this example, a time-frequency representation of the emitted signal is illustrated graphically in FIG. 8. The graph of FIG. 8 represents the emitted signals when the high-frequency vibrators 32 and the low-frequency vibrators 34 in each vibrator array 24 emit simultaneously the high and low frequencies. To avoid notches at the overlapping frequencies between the low-frequency sweep and the high-frequency sweep, the same sweep rates may be used at the same locations L1 and H1 in the time-frequency plan. A time-frequency representation of the signature of a given vibrator array 24 when only the low frequencies are emitted is illustrated graphically in FIG. 9.

The processing of data acquired according to the present methodology can be performed according to a variety of processing methods on several types of processing equipment. In some applications, the processing system maybe a computer-based processing system incorporated, at least in part, into the electronics 36. In other applications, the seismic data is simply recorded and processed on remote processing systems as with conventional seismic analysis.

By way of example, the continuously recorded stream of data is correlated for the low-frequency sweep with the appropriate phase to obtain the combined and compressed response of the Earth's interior to the low-frequency signals emitted by the flip sources and the flop sources at a given location. Because the low-frequency sources, e.g., low-frequency vibrators 34, are emitting low frequencies, they can be considered a single source. The response compressed in time is the impulse response of the Earth's interior convolved with the Klauder wavelet generated as autocorrelation of the low-frequency sweep. The correlation of the recorded data with the high-frequency sweep produces the compressed response of the Earth's interior to the high frequencies generated either by the flip source or by the flop source, e.g., either the flip side or the flop side high-frequency vibrators 32.

Figure 4:
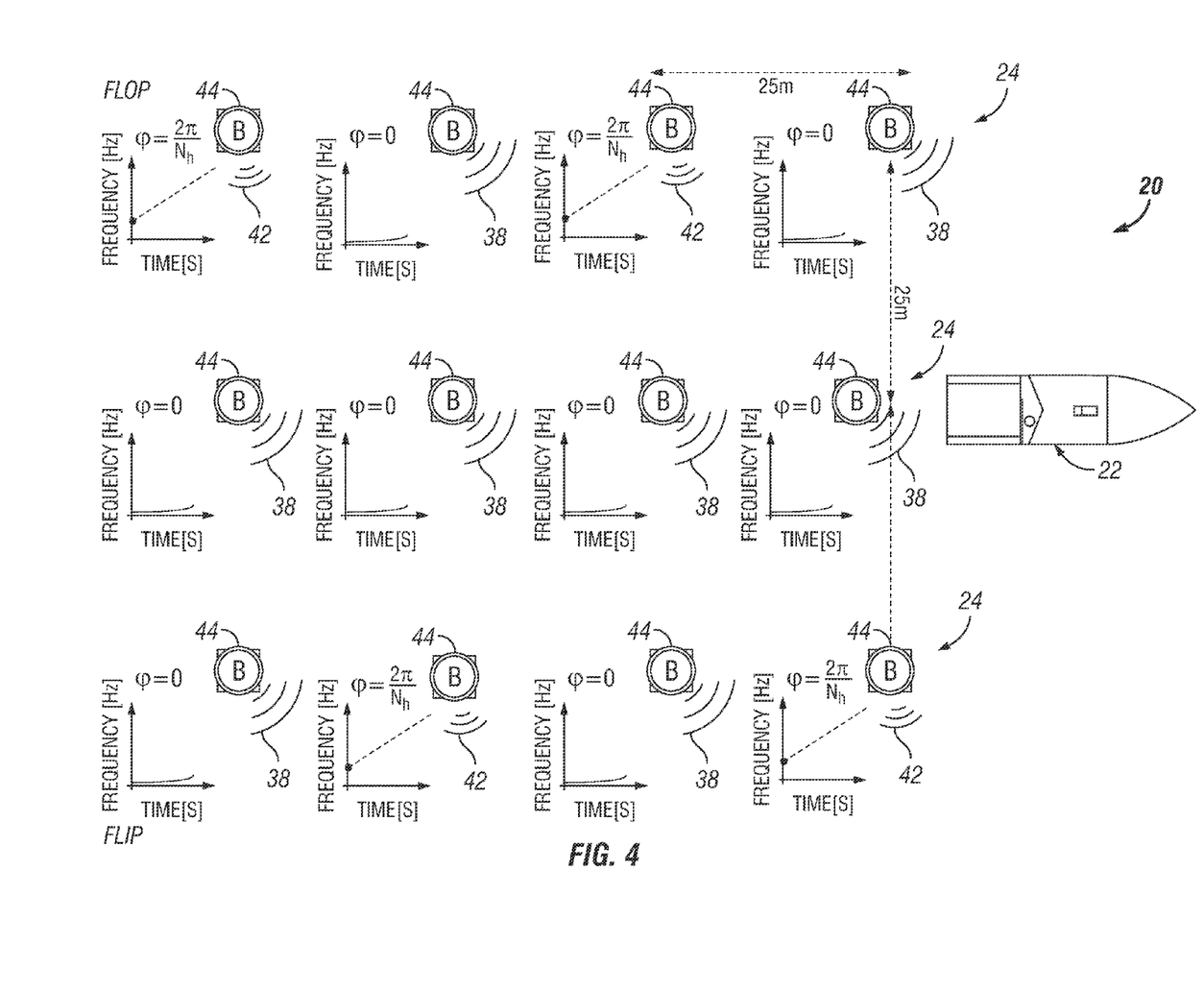
FIG. 4 is a schematic illustration of another example showing the sweeping of low-frequency signals and the alternating output of high-frequency signals from the plurality of seismic vibrator arrays, according to an embodiment of the present disclosure.

Referring generally to FIG. 4, another example of marine vibroseis acquisition is illustrated. In this embodiment, 100% of the available sources are utilized. By way of example, three vibrator arrays/sub-arrays 24 may be used and each array 24 is composed of at least one vibrator 44. The individual vibrators 44 can emit either the low or the high frequencies (38, 42) at amplitudes that are within the frequency dependent mechanical limits of the vibrators 44. According to an embodiment, the central vibrator array 24 emits the low frequencies continuously and the external vibrator arrays 24 emit the high frequencies 42 in a flip-flop scheme.

Figure 5:
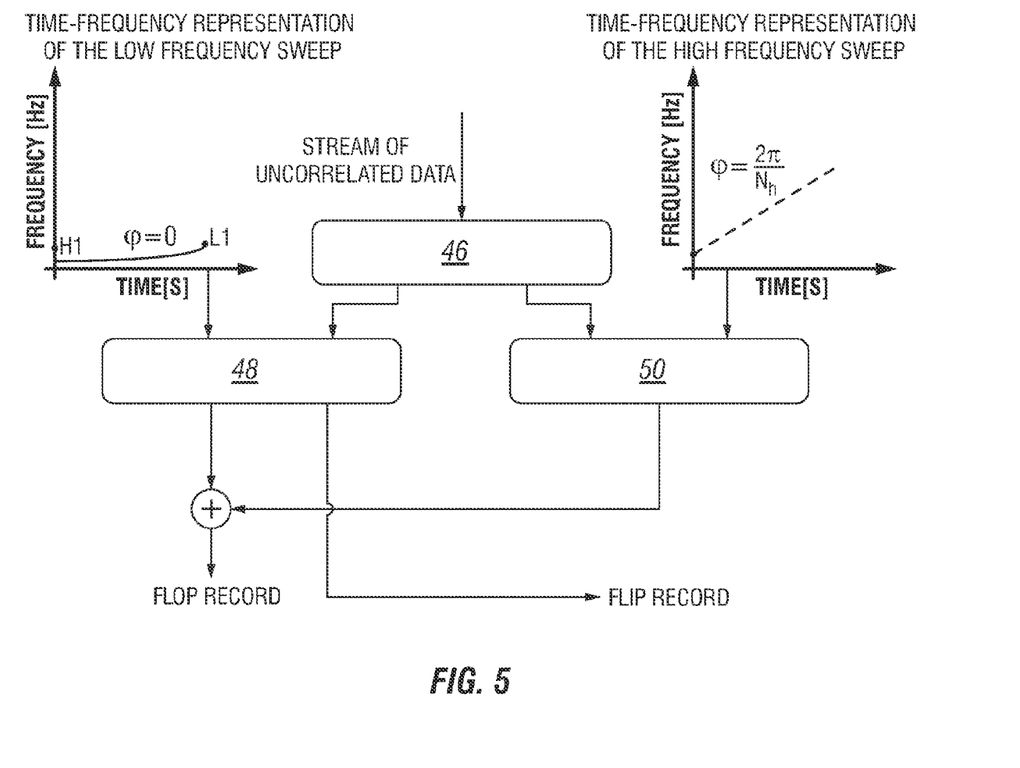
FIG. 5 is a flowchart illustrating data processing for a plurality of seismic vibrator arrays, according to an embodiment of the present disclosure.

An example of a processing technique for the data acquired with the methodology described with reference to FIG. 4 is illustrated schematically by FIG. 5. In this example, the high frequency sweep contributes to the flop record. The continuous stream of uncorrelated data is parsed according to the start times of the sweeps, as represented by block 46. The portion of uncorrelated data starts at the sweep start time (which is identical for the low and high frequencies sources in this example) and its duration is equal to the sweep length (e.g., 10 s in the case of continuous slip-sweep acquisition with 25 m inline source interval and vessel speed of 2.5 m/s) plus the listening time, which may be between 5 and 10 s. The parsed uncorrelated data is duplicated and input to two processing branches: the low and high frequency processing branches. The data correlated with the low frequency sweep is duplicated and contributes to both the flip and the flop records, as indicated by block 48. The data correlated with the high frequency sweep contributes only to the flop record in this example, as indicated by block 50. In this embodiment, the signals emitted by the port and starboard sources 44 are swapped at the next shot locations.

Figure 6:
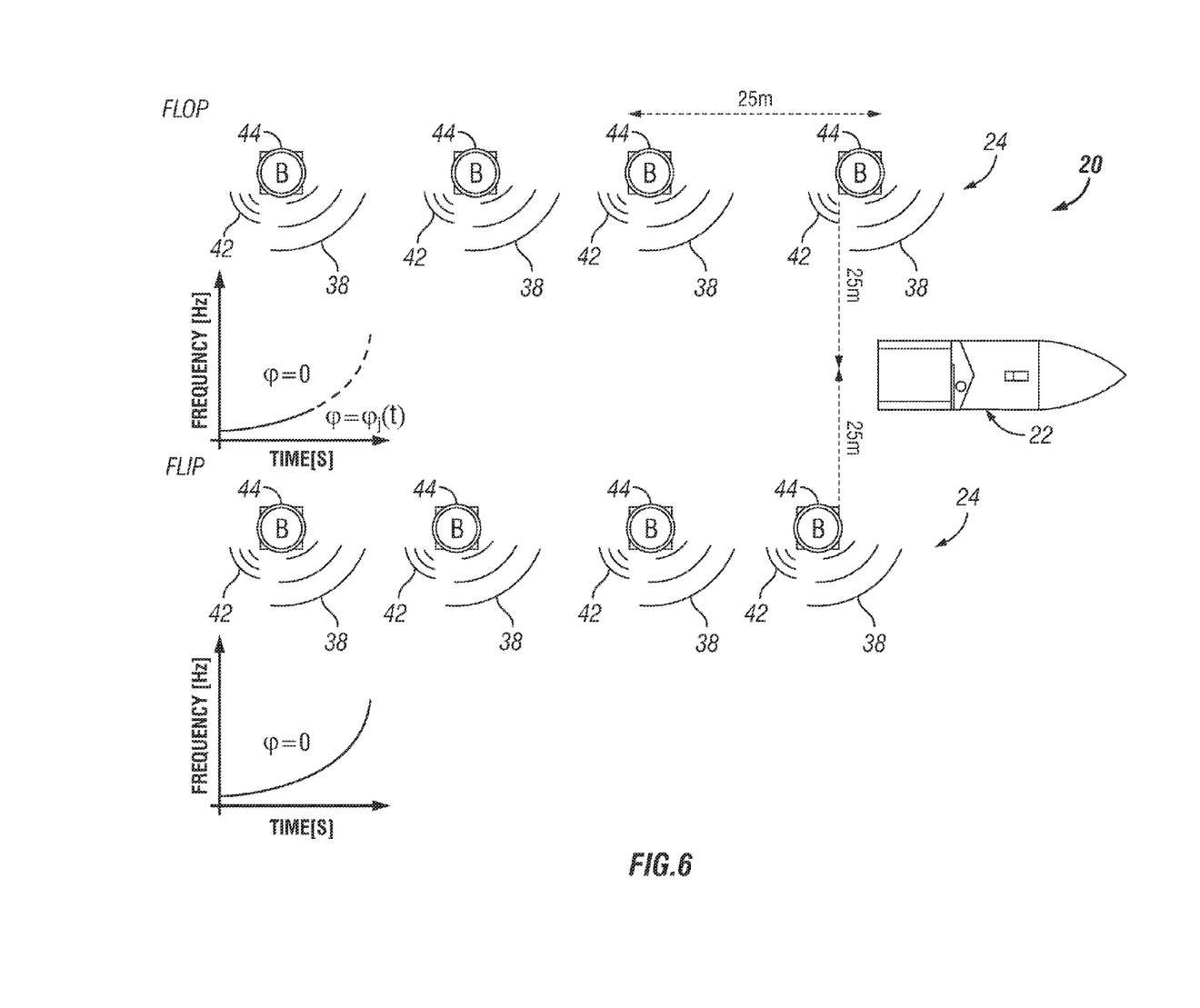
FIG. 6 is a schematic illustration of another example showing the sweeping of low-frequency signals and the alternating output of high-frequency signals from the plurality of seismic vibrator arrays, according to an embodiment of the present disclosure.

Referring generally to FIG. 6, an arrangement similar to that of FIG. 3 is illustrated. The embodiment of FIG. 6 demonstrates marine vibroseis acquisition with continuous emission of the low and high frequencies. In this example, the high frequencies are emitted with sweeps that have a shot phase term that is a function of the shot position and instantaneous frequency. In this latter embodiment, the vibrators may be combined vibrators 44 which continuously emit low and high frequencies. The low frequencies, up to an instantaneous frequency $f_c$ which can be determined following the method previously described, are emitted in phase. The instantaneous frequency $f_c$ corresponds to an instantaneous time $t_c$. The start time of each sweep is supposed to be the zero time.

The flip and flop sweeps emitted at the $i^{th}$ shot position are represented by:

$$s_{1i}(t) = A(t)\sin\left(2\pi \int_0^t f_i(\tau)d\tau\right)$$

$$s_{2i}(t) = A(t)\sin\left(2\pi \left(\int_0^t f_i(\tau)d\tau\right) + \varphi_i(t)\right)$$

The subscript i denotes the inline positions of the sources and is common to the flip and flop source. The instantaneous frequency in the particular case of linear sweeps is a linear function of τ. The phase term $\phi_i(t)$ contained in the sweep emitted by the flop source is a function of the shot position and the instantaneous frequency (or equivalently the instantaneous time). $\phi_i(t)$ is designed such that at frequencies higher than $f_c$ the signal due to the flop source $s_2$ appears incoherent when the data are correlated with the flip sweep and sorted in a domain different than the shot gather domain. A possible choice for $\phi_i(t)$ is:

$$\phi_i(t)=0 \text{ for } t<t_c$$

$$\phi_i(t)=k_i(t-t_c) \text{ for } t_c<t<T$$

where $t_c$ is the instantaneous time that corresponds to the instantaneous frequency $f_c$. $f_c$ splits the frequency range between the low frequencies that do not need to be separated and the high frequencies that do need separation. T is the sweep length. The term $k_i$ is a random variable that depends on the shot position. An example of a choice for $k_i$ is a uniformly distributed random variable, e.g., $0<k_i<2\pi/(T-t_c)$. Other choices of $\phi_i(t)$ are possible as long as the condition is satisfied that the recorded signals due to the flop source are randomized when the recorded signals are correlated with the flip sweep and sorted in a domain different than the shot gather domain, e.g., the common receiver domain. This choice of $\phi_i(t)$ also produces the dual effect, i.e., the signals due to the flip source are randomized when the recorded data are correlated with the shot dependent flop sweeps and sorted in a domain different than the common shot domain.

Figure 7:
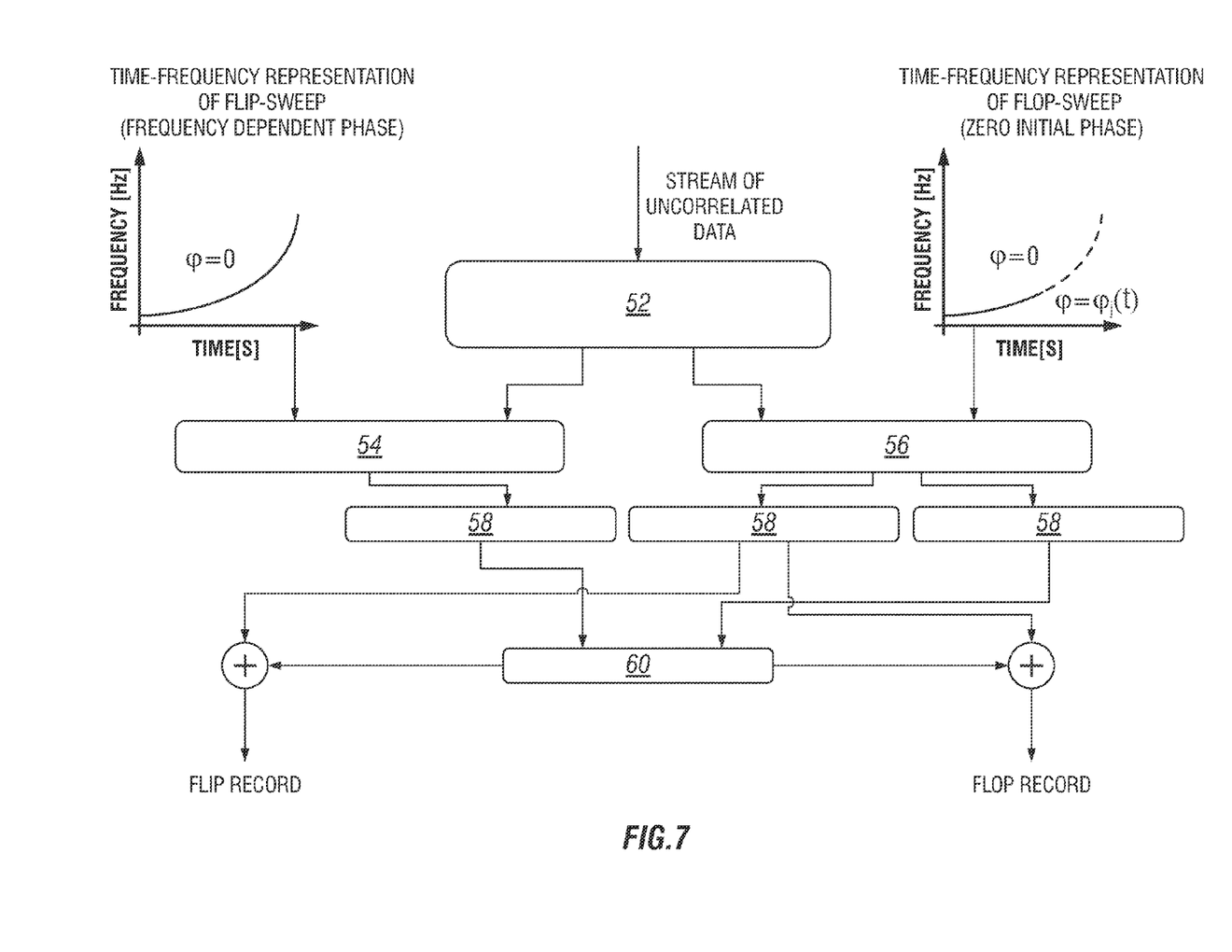
FIG. 7 is a flowchart illustrating data processing for a plurality of seismic vibrator arrays, according to an embodiment of the present disclosure.

An example of a processing technique for the data acquired with the methodology described with reference to FIG. 6 is illustrated schematically by FIG. 7. In this example, the stream of uncorrelated data is parsed and duplicated, as indicated by block 52, and then correlated with the flip and flop sweeps, as indicated by blocks 54 and 56, respectively. A pass-band filter centered at low frequencies may be applied to the output of the flop sweep correlation, as indicated by blocks 58. The output of this pass-band filter contributes to both flip and flop records. It should be noted that correlation with the flip sweep and pass-band at low frequencies gives exactly the same result and it is not shown in the figure. The low frequency output of the "flop branch" is used for the flip record as well. The outputs of the flip and flop pass-band filters centered at high frequencies are input to an algorithm for the separation of the interfering events. An example of a suitable algorithm is disclosed in the patent application WO2009085474 A4 SEPARATING SEISMIC SIGNALS PRODUCED BY INTERFERING SEISMIC SOURCES. The illustrated embodiment provides a finer inline sampling for the high frequencies. However, because the high frequencies are simultaneously emitted, albeit with phase differences that depend on shot position and instantaneous frequency, this embodiment of the disclosed method may utilize a separation algorithm implemented in a wavefield separator 60.

It should be noted that embodiments of this disclosure have used marine vibrators because the inherent motion of a seismic vessel that tows two or more sources facilitates the practical implementation of the method. However, the application to onshore seismic acquisition is also possible by utilizing two or more closely spaced land vibrators to move approximately with the same speed. Also in the case of land vibrators, the separation between vibrators dictates the maximum frequency that can be emitted simultaneously and in phase by two or more vibrators.

Figure 9:
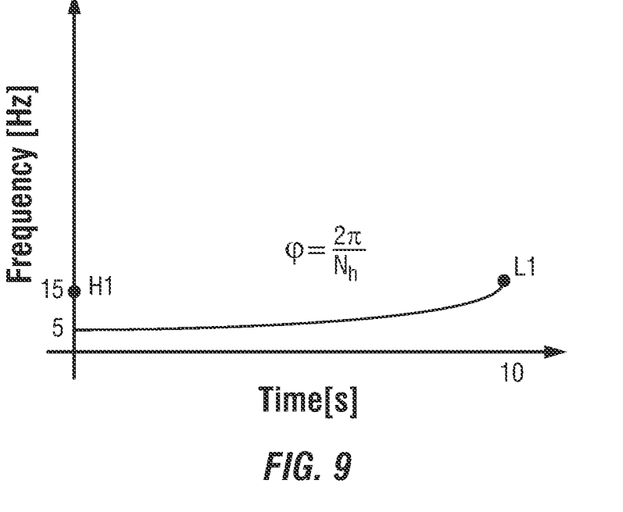
FIG. 9 is a graphical illustration showing a time-frequency representation of the vibrator array signature when only the low frequencies are emitted, according to an embodiment of the present disclosure.
Figure 10:
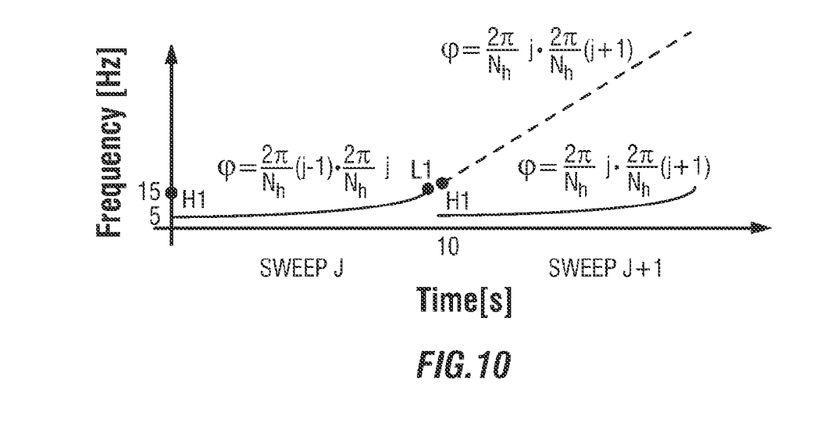
FIG. 10 is a graphical illustration showing sweep phases, according to an embodiment of the present disclosure.

The capability of generating composite sweeps without a notch at the overlapping frequencies enables a different and simpler processing of the data. As discussed above, one available methodology for generating composite sweeps without a notch at the overlapping frequencies is described in UK Patent GB2451630. The continuous stream of data is correlated with the composite sweep generated at each location to obtain either the flip or the flop record at all the frequencies in the composite sweep. For this processing methodology, greater convenience may be achieved by not maintaining the sweep phase as constant but instead maintaining the sweep phase as frequency dependent in such a way that the phase at the L1 location in the time-frequency representation in FIG. 9 is the same as the phase at the H1 location of the next sweep. A graphical representation of this approach is provided in FIG. 10 which illustrates the sweep rate at L1 for sweep j is equal to the sweep rate at H1 for sweep j+1.

Figure 11:
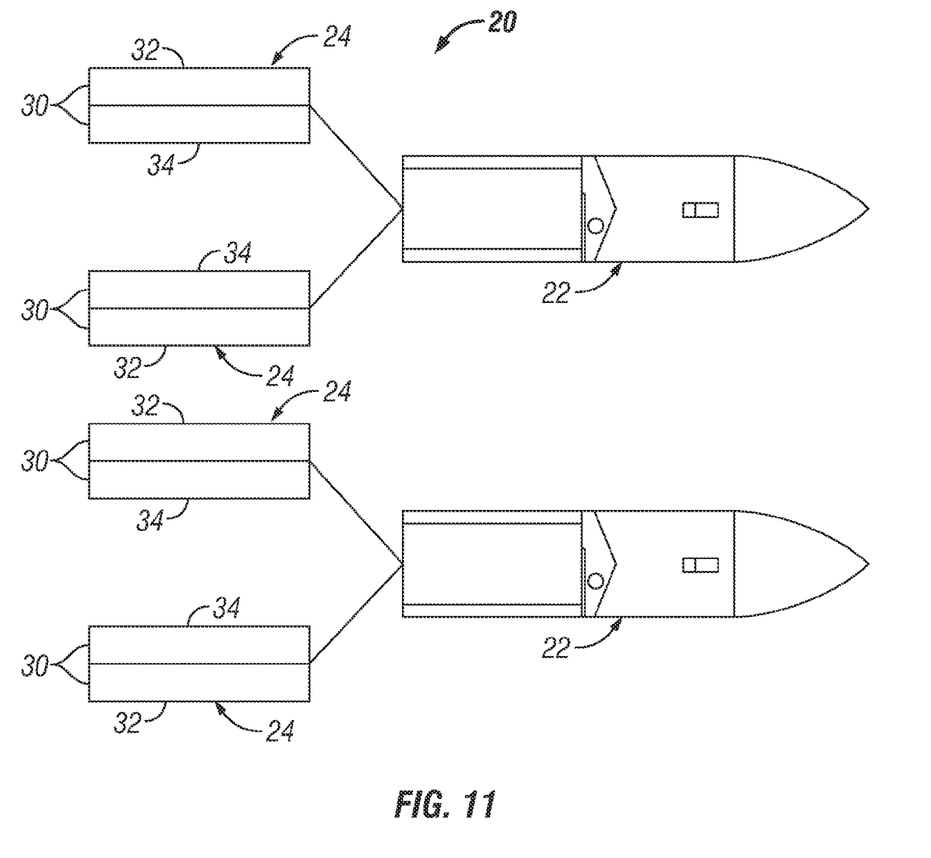
FIG. 11 is a schematic view of another example in which a plurality of tow vessels is employed to tow a plurality of seismic vibrator arrays, according to an embodiment of the present disclosure.

Depending on environmental and application parameters, the seismic acquisition system 20 and the methodology for performing the seismic survey may take the form of other embodiments. Referring to FIG. 11, for example, another embodiment is illustrated in which a multi-vessel operation is employed. In this embodiment, a plurality of tow vessels 22 is used to pull seismic source arrays 24. Each tow vessel 22 may be equipped with two or more vibrator arrays 24 that continuously emit the very low frequencies while the high frequencies are emitted in a flip-flop mode. In this example, the very low frequencies may be defined as those frequencies that generate wavelengths larger than the separation between the tow vessels 22.

In some embodiments, the entire frequency range to be swept is split into two frequency ranges. In other embodiments, however, the total frequency range can be split into other numbers of frequency ranges and, theoretically, into an infinite number of frequency ranges. For example, the total frequency range can be split into a number of frequency ranges equal to the number of seismic vibrator units 30 that compose each vibrator array 24. According to another embodiment, the marine vibrators 30 emit sweeps that are in phase only at the very low frequencies, e.g., 5-15 Hz. At higher frequencies, a frequency, vibrator and shot-point dependent phase shift function may be applied to the emitted sweeps. The frequency dependent phase shifts cause a randomization of the interfering events when the data is sorted in a domain, e.g., a common channel, different than the acquisition domain and correlated with the emitted frequency sweeps associated with a given tow vessel 22. This randomization of the interfering events enables application of standard random noise attenuation techniques.

Certain aspects of the methodology for utilizing seismic sources, e.g., marine vibrators 30, also can be implemented on the seismic receiver side of a marine vibroseis acquisition application. For example, the technique may be utilized with seismic receivers 28 of streamers 26 or with seismic receivers positioned at other suitable locations. The sampling of the received wavefield should be frequency dependent. For example, two receivers 28 positioned only a short distance apart, e.g., 5 m, sample essentially the same wavefield at a given frequency, e.g., 5 Hz. Individual digitization of the signals acquired by these two seismic receivers 28 is not useful and their signals can simply be summed. The generalization of this idea to a number of sensors/seismic receivers 28 located in an area that is small relative to the wavelength at the frequency of interest provides an improved telemetry system with a substantial reduction in the bit rate that must be transmitted.

Although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A method of seismic surveying, comprising:
   towing a pair of marine vibrator arrays to conduct a seismic survey;
   providing each marine vibrator array with at least one low frequency marine vibrator to emit low-frequency signals of 15 Hz or less and at least one high-frequency marine vibrator to emit high-frequency signals of greater than 15 Hz;
   using the at least one low-frequency marine vibrator of each marine vibrator array to emit the low-frequency signals simultaneously and in phase during a sweep of a given duration; and
   employing the at least one high-frequency marine vibrator of each marine vibrator array to emit the high-frequency signals according to a flip-flop pattern alternating between the marine vibrator arrays.

2. The method as recited in claim 1, wherein employing comprises emitting the high-frequency signals from a first marine vibrator array of the marine vibrator arrays during alternate, sequential sweeps of the low frequency signals.

3. The method as recited in claim 2, wherein employing comprises emitting the high-frequency signals from a second marine vibrator array of the marine vibrator arrays during alternate, sequential sweeps of the low frequency signals and while the high-frequency signals are not being emitted from the first marine vibrator array.

4. The method as recited in claim 1, wherein towing comprises towing the pair of marine vibrator arrays at between 2 and 3 meters per second.

5. The method as recited in claim 1, further comprising providing a duration of approximately 10 seconds between each flip sweep and flop sweep occurring sequentially according to the flip-flop pattern.

6. The method as recited in claim 4, further comprising providing an in-line shot interval of 20 meters to 30 meters.

7. The method as recited in claim 1, wherein towing comprises towing additional marine vibrator arrays.

8. The method as recited in claim 1, further comprising utilizing a shot interval for the pair of marine vibrator arrays which is frequency dependent.

9. The method as recited in claim 1, wherein towing comprises using a plurality of tow vessels.

10. A seismic survey system, comprising:
    a plurality of marine vibrator arrays, each marine vibrator array having at least one low frequency marine vibrator to emit low-frequency signals of 15 Hz or less and at least one high-frequency marine vibrator to emit high-frequency signals of greater than 15 Hz; and
    electronics coupled to the plurality of marine vibrator arrays to control emitting of the low and high frequency signals, including emitting of the low-frequency signals simultaneously and in phase during sweeps of a given duration with respect to the plurality of marine vibrator arrays and further including emitting of the high-frequency signals according to a flip-flop pattern alternating between marine vibrator arrays of the plurality of marine vibrator arrays.

11. The seismic survey system as recited in claim 10, further comprising a single tow vessel coupled to the plurality of marine vibrator arrays.

12. The seismic survey system as recited in claim 10, further comprising a plurality of tow vessels coupled to the plurality of marine vibrator arrays.

13. The seismic survey system as recited in claim 10, wherein the plurality of marine vibrator arrays comprises two marine vibrator arrays.

14. The seismic survey system as recited in claim 10, further comprising a plurality of streamers containing seismic receivers.

15. A method of seismic surveying, comprising:
    providing a plurality of vibrator arrays to conduct a seismic survey utilizing low frequency and high frequency vibrations in each vibration array;
    continuously sweeping low-frequency signals with the low-frequency vibrators in the plurality of vibrator arrays; and
    employing the high-frequency vibrators to emit high-frequency signals in an alternating pattern between vibrator arrays of the plurality of vibrator arrays.

16. The method as recited in claim 15, wherein providing comprises providing two vibrator arrays.

17. The method as recited in claim 15, wherein providing comprises providing a plurality of marine vibrator arrays; and further comprising towing the plurality of marine vibrator arrays.

18. The method as recited in claim 15, wherein continuously sweeping comprises emitting low-frequency signals of 15 Hz or less.

19. The method as recited in claim 15, wherein employing comprises emitting high-frequency signals greater than 15 Hz.

20. The method as recited in claim 15, wherein employing comprises emitting the high-frequency signals in a flip-flop pattern to avoid overlap of the high-frequency signals.

21. A method of seismic surveying, comprising:
    Providing at least two vibrator arrays to conduct a seismic survey, each of the vibrator arrays comprising a low frequency vibrator and a high frequency vibrator;
    continuously sweeping low-frequency signals with the low-frequency vibrators in the plurality of vibrator arrays; and
    employing the high-frequency vibrators to emit at least partially simultaneous sweeps that have a shot phase that is a function of a shot position.

22. The method as recited in claim 21, wherein providing comprises providing two vibrator arrays.

23. The method as recited in claim 21, wherein providing comprises providing a plurality of marine vibrator arrays; and further comprising towing the plurality of marine vibrator arrays.

24. The method as recited in claim 21, wherein continuously sweeping comprises emitting low-frequency signals of 15 Hz or less.

25. The method as recited in claim 21, wherein employing comprises emitting high-frequency signals greater than 15 Hz.

26. The method as recited in claim 21, wherein employing further comprises processing data by using frequency dependent phase shifts to separate simultaneously emitted high frequencies.

* * * * *